United States Patent
Garcia Gomez et al.

(10) Patent No.: US 12,330,373 B2
(45) Date of Patent: Jun. 17, 2025

(54) BUILD CAKE DROP HEIGHT DETERMINATION

(71) Applicant: Peridot Print LLC, Palo Alto, CA (US)

(72) Inventors: Arturo Garcia Gomez, Sant Cugat del Valles (ES); Ruben Prats Gonzalez, Sant Cugat del Valles (ES); Rafel Texido Valls, Sant Cugat del Valles (ES); Ernesto Alejandro Jones Poppescou, Sant Cugat del Valles (ES)

(73) Assignee: Peridot Print LLC, Palo Alto, CA (US)

( * ) Notice: Subject to any disclaimer, the term of this patent is extended or adjusted under 35 U.S.C. 154(b) by 129 days.

(21) Appl. No.: 18/033,675

(22) PCT Filed: Oct. 29, 2020

(86) PCT No.: PCT/US2020/058043
§ 371 (c)(1),
(2) Date: Apr. 25, 2023

(87) PCT Pub. No.: WO2022/093246
PCT Pub. Date: May 5, 2022

(65) Prior Publication Data
US 2023/0364862 A1    Nov. 16, 2023

(51) Int. Cl.
*B29C 64/35* (2017.01)
*B29C 64/245* (2017.01)
(Continued)

(52) U.S. Cl.
CPC ............ *B29C 64/35* (2017.08); *B29C 64/245* (2017.08); *B29C 64/393* (2017.08); *B33Y 30/00* (2014.12); *B33Y 40/20* (2020.01); *B33Y 50/02* (2014.12)

(58) Field of Classification Search
CPC .......... B33Y 10/00; B33Y 30/00; B33Y 50/02; B29C 64/35; B29C 64/357; B29C 64/30;
(Continued)

(56) References Cited

U.S. PATENT DOCUMENTS 10,391,556 B2    8/2019   Barnhart
2008/0241404 A1* 10/2008  Allaman ............... B29C 64/357
                                                    118/308
(Continued)

FOREIGN PATENT DOCUMENTS

EP    3486007 A1     5/2019
KR    10-1765142 B1  8/2017

OTHER PUBLICATIONS

Nguyen, H., et al., "Development of a Robotic System for Automated Decaking of 3D-Printed Parts", Mar. 11, 2020, pp. 7.

*Primary Examiner* — Jamel M Nelson
(74) *Attorney, Agent, or Firm* — Shook, Hardy & Bacon L.L.P.

(57) ABSTRACT

According to an example, an apparatus for a three-dimensional printing system comprises a chamber, an actuator, and a controller. The chamber comprises an opening towards the top of the chamber to receive a container having an openable base and the container is to contain a build cake, wherein the chamber further comprises a platform movable below the opening that is to receive the build cake when the base of the container is opened. The actuator is to move the platform within the chamber, and the controller is to position the platform at a build cake receiving position such that when the container base is opened, the build cake drops onto the platform generating a shock wave that is transmitted into the build cake.

15 Claims, 4 Drawing Sheets

(51) Int. Cl.
*B29C 64/393* (2017.01)
*B33Y 30/00* (2015.01)
*B33Y 40/20* (2020.01)
*B33Y 50/02* (2015.01)

(58) Field of Classification Search
CPC ..... B29C 64/255; B29C 64/25; B29C 64/259; B29C 64/141; B29C 64/153
See application file for complete search history.

(56) References Cited

U.S. PATENT DOCUMENTS

| | | |
|---|---|---|
| 2016/0318102 A1* | 11/2016 | Barnhart .................... B28B 3/02 |
| 2018/0126670 A1* | 5/2018 | DehghanNiri ........ B29C 64/386 |
| 2018/0326488 A1* | 11/2018 | Lappas ................ B23K 26/144 |
| 2019/0134909 A1 | 5/2019 | Nicaise et al. |
| 2019/0240913 A1* | 8/2019 | Jordan ................... B33Y 40/20 |
| 2021/0206072 A1* | 7/2021 | Chae ...................... B33Y 30/00 |

* cited by examiner

BUILD CAKE DROP HEIGHT DETERMINATION

BACKGROUND

Three-dimensional printing systems generate three-dimensional objects by forming layers of build material and selectively solidifying portions thereof. These layers form a volume known as a build cake, wherein the build cake comprises three-dimensional objects surrounded by unsolidified build material. A subsequent decaking operation is performed in order to separate generated three-dimensional objects from unsolidified build material in the build bed.

BRIEF DESCRIPTION OF DRAWINGS

Features of the present disclosure are illustrated by way of example and are not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent, however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Additive manufacturing, or three-dimensional printing, techniques may generate three-dimensional objects through the solidification of build material. In an example, the build material is a powder-like granular material, which may for example be a plastic, ceramic or metal powder and the properties of generated objects may depend on the type of build material and the type of solidification mechanism used. Build material may be deposited, for example, on a build platform and processed layer by layer, for example within a build chamber of an additive manufacturing system. According to one example, a suitable build material may be PA12 build material commercially referred to as V1R10Series "HP PA12" available from HP Inc.

In some examples, selective solidification is achieved through directional application of energy, for example using a laser or an electron beam which results in melting, and subsequent solidification, of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may, for example, be determined from structural design data). The fusing agent may have a composition which absorbs energy such that, when energy (for example, heat) is applied to the layer, the build material to which it has been applied heats up, coalesces, and solidifies, upon cooling, to form a layer of the three-dimensional object in accordance with the pattern. In other examples, coalescence may be achieved in some other manner.

According to an example, a suitable fusing agent may be an ink-type formulation comprising carbon black, such as, for example, the fusing agent formulation commercially referred to as V1Q60Series "HP fusing agent" available from HP Inc. Such a fusing agent may comprise any or any combination of an infra-red light absorber, a near infra-red light absorber, a visible light absorber, and a UV light absorber. Examples of fusing agents comprising visible light absorption enhancers are dye based colored ink and pigment based colored ink, such as inks commercially referred to as V1Q73Series, V1Q74Series, V1Q75Series and V1Q76Series available from HP Inc.

In some examples, in addition to a fusing agent, a print agent may comprise a detailing, or coalescence modifier, agent, which acts to modify the effects of a fusing agent for example by reducing or increasing coalescence or to assist in producing a particular finish or appearance of an object. In some examples, detailing agent may be used near edge surfaces of an object being printed to reduce thermal bleed. According to one example, a suitable detailing agent may be a formulation commercially referred to as V1Q61Series "HP detailing agent" available from HP Inc. A coloring agent, for example comprising a dye or colorant, may in some examples be used as a fusing agent or a coalescence modifier agent, and/or as a print agent to provide a particular color for the object.

As noted above, three-dimensional printing systems may generate three-dimensional objects based on structural design data. This may involve a designer designing a three-dimensional model of a three-dimensional object to be generated, for example using a computer aided design (CAD) application. The print job may define the solid portions of a series of three-dimensional objects having a spatial arrangement. To generate the three-dimensional object from the print job within a build unit of a three-dimensional printing system, the print job may comprise, or can be processed to derive, slices or parallel planes of the object models. Each slice may define a portion of a respective layer of build material that is to be solidified or caused to coalesce by the additive manufacturing system to generate a layer of the object.

Three-dimensional printing systems may execute cleaning operations in order to obtain the three-dimensional objects as designed in the structural design data. Since the generation of three-dimensional objects is performed by selectively solidifying build material to obtain three-dimensional objects within a build cake, the three-dimensional objects are surrounded by unsolidified build material. To separate generated objects from non-solidified build material a cleaning station may be used.

Throughout the description, the term "build cake" will be used to refer to the volume of solidified build material and unsolidified build material obtained after forming and selectively solidifying layers of build material to obtain the three-dimensional objects defined in a print job.

After completion of a 3D printing print job, the resulting build cake may be transferred to a transfer container in order to perform cleaning operations. Build units are typically used to transfer the build cake to a transfer container, wherein a build unit is an open-topped chamber having a vertically movable platform. The platform may be used to vertically move the build cake into a container placed on top of the build unit such that the build cake is transferred to the container. The container may comprise a base that is closed when the build cake has been moved within the container such that the build cake is kept within the container.

Once the build cake has been transferred to the transfer container, the transfer container may be transported to a cleaning apparatus such as a cleaning station. In the cleaning station, the unsolidified build material of the build cake will be partially (or totally) separated from the three-dimensional objects. The cleaning station may perform operations on the build cake, such as imparting a shock wave into the build material to displace the unsolidified build material, ejecting a gas stream towards the build cake, or displacing the contents of the build cake by transmitting a vibration into the build cake. In other examples, the three-dimensional printing system may comprise a build unit in which the cleaning operations may be performed. Instead of transferring, conveying, transporting or moving the transfer container from the build unit to the cleaning station, the build unit may perform both the build cake generation and the cleaning operations.

Figure 1:
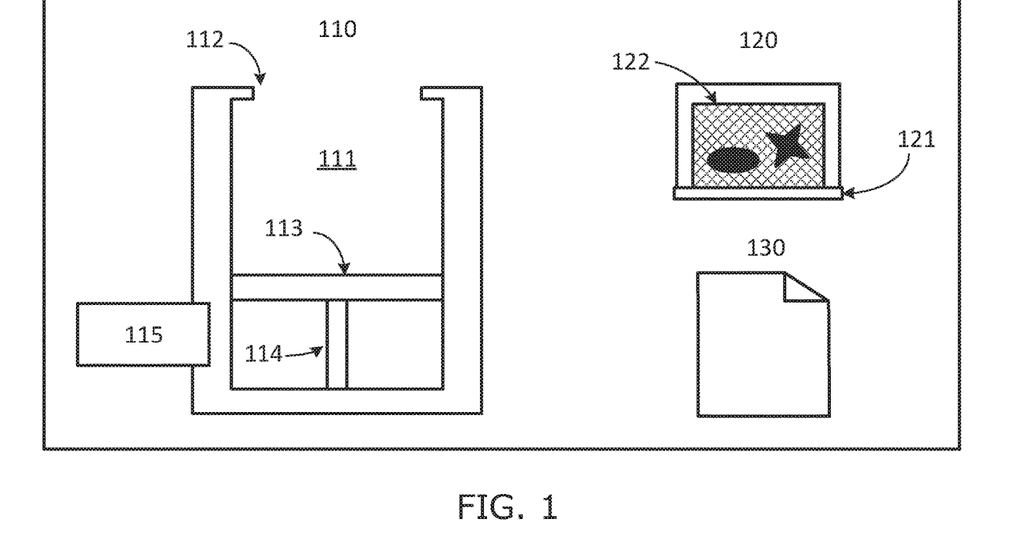
FIG. 1 shows a three-dimensional printing system, according to an example of the present disclosure.

Referring now to FIG. 1, a cleaning station 110 for use with a three-dimensional printing system 100 is shown. The cleaning station 110 is to receive a transfer container 120 containing a build cake 122. The cleaning station 110 and the transfer container 120 are illustrated in a schematic cross-section. The cleaning station 110 comprises a chamber 111 having an aperture 112 in a top surface (i.e. the top of the chamber), a vertically movable platform 113 coupled to an actuator 114, and a controller 115 to control the position of the platform 113 within the chamber 111. The platform 113 is to receive the build cake 122 when the base of the container 121 is opened. In an example, the actuator 114 is a telescopic actuator that has a stroke long enough to move the platform to a position in which is adjacent to the aperture 112. In other examples, the actuator 114 may be replaced by a pair of actuators.

To engage the transfer container 120 with the cleaning station 110, the base 121 may be positioned over the cleaning station 110 such that the lower surface of the openable base 121 faces the opening 112. The opening 112 may be at least partially surrounded by one or multiple interface elements (not shown) to enable the container 120 to be releasably secured to the cleaning station 110. The interface may include a seal element (not shown) to seal the base of the container 120 to the cleaning station 110 to prevent any build material from escaping through the interface.

In the example of FIG. 1, the three-dimensional printing system 100 further comprises data storage 130 to store data associated with the content of the transfer container 120, i.e. the build cake 122. The build cake 122 comprises a set of three-dimensional objects (represented in FIG. 1 in solid black) surrounded by a volume of unsolidified build material (represented in FIG. 1 in a cross-hatch pattern). Data storage 130 may be read by the controller 115 and the controller 115, based on the data, may determine a position at which the platform 113 is to be moved by the actuator 114 in order to receive the build cake 122. In an example, the data comprises at least one of a content of the build cake 122, a type of material used to form the build cake 122, a state (such as a temperature) of the build cake 122, a geometry of any three-dimensional object contained within the build cake 122, and a distribution of any three dimensional object within the build cake 122.

According to an example, the cleaning station 110 may perform a decaking operation on the build cake 122 to displace (or eventually remove) the unsolidified build material that surrounds the three-dimensional objects. However, since unsolidified build material may have different flowability levels, a single action may not be enough so as to disturb, displace, or remove all the unsolidified build material. Therefore, several actions may be executed based on a type of unsolidified build materials. In other examples, a single action may have an impact on different types of build materials with different flowability levels within the build cake at the same time.

Figure 2:
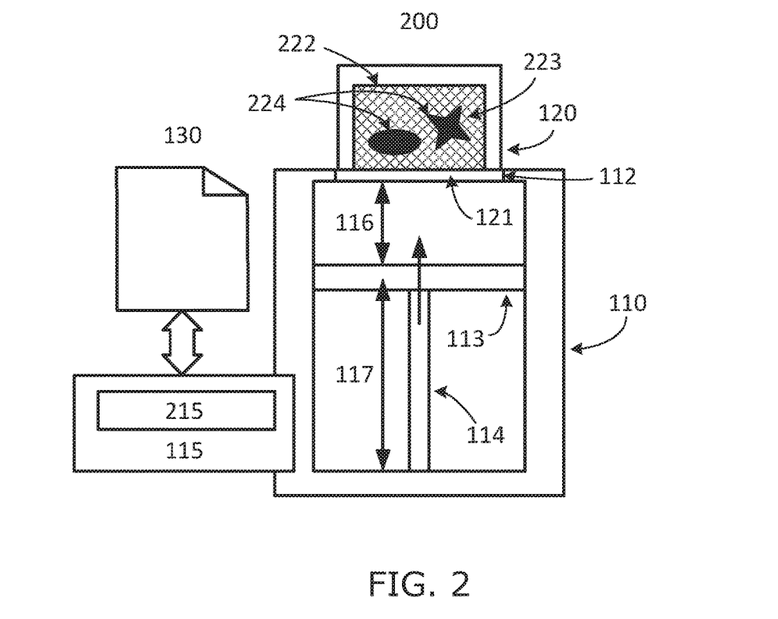
FIG. 2 shows a schematic cross-section of a three-dimensional printing system in which a support platform is positioned at a determined position, according to an example of the present disclosure.

Referring now to FIG. 2, a schematic cross-section of a three-dimensional printing system 200 is shown. The same or corresponding components as in FIG. 1 are designated by the same reference numbers. The three-dimensional printing system 200 comprises the cleaning station 110 engaged with the transfer container 120, wherein the base 121 of the container 120 is facing the aperture 112 of the chamber of the cleaning station 110. The cleaning station 110 further comprises the controller 115, wherein the controller 115 comprises a set of instructions 215 to determine, using the data stored on data storage 130, a height 116 at which the platform 113 is to be positioned below the base of the container 120 to receive the build cake 222 when the base 121 of the container 120 is opened. The controller 115 is to control the actuator 114 to position the platform 113 at the determined height 116.

The determined height 116 is a height through which a build cake 222 is to be dropped onto the platform 113 when the removable base 121 is removed from the transfer container 120. Dropping the build cake 222 from the determined height 116 onto the platform 113, causes the build cake 222 to at least partially spread over the platform 113. Without being bound by any particular theory, this may be due to a shockwave being transmitted through at least a portion of the build cake due to the falling build cake 222 colliding with the stationary platform 113. In some examples, the controller 115 obtains the data associated with the build cake 222 from a tag of the container 120. The tag may be attached on a surface of the container 120, such that a sensor such as a tag reader may read information related to the build cake. In one example the tag is a storage device such as a memory chip.

Figure 3:
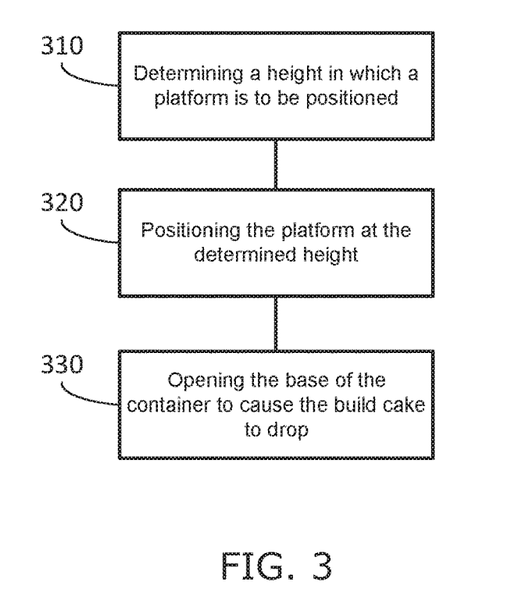
FIG. 3 shows a method to transmit a shock wave into a build cake, according to an example of the present disclosure.

Referring now to FIG. 3, a method 300 to transmit a shock wave into a build cake is shown. Elements of the three-dimensional printing system 200 are controlled by the controller 115, in accordance with the set of instructions 215, to perform the method 300. At block 310, the method 300 comprises determining a height in which a platform is to be positioned 310 to receive the build cake when the base of the container is opened. The controller 115 obtains data associated to the build cake from a data storage so that the position in which the platform is to be positioned is determined based on such data. At block 320, the method 300 comprises positioning the platform at the determined height. As previously described in FIG. 2, the controller controls an actuator to position the platform at the determined height previously determined at block 310. At block 330, the method 300 comprises opening the base of the container to cause the build cake to drop. Once the platform is positioned (block 320) by the actuator at the previously determined height (block 310) within a chamber of a cleaning station, the base of the container is opened (block 330) and the build cake drops. As described with reference to the three-dimensional printing system 200 of FIG. 2, the height is determined from an openable base of a container to the platform of the cleaning station. The controller controls the platform to move to the determined height below the base and then the controls the opening of the base of the container so as to cause the build cake to drop under gravity onto the platform to cause a shock wave to be transmitted into the build cake to assist in a subsequent decaking process. Dropping the build cake onto the platform causes the build cake to at least partially spread over the platform. In an example, the method 300 further comprises emitting, with a set of cleaning elements distributed along the chamber, a gas stream towards the build cake to displace unsolidified build material from the build cake during the subsequent decaking process. In some examples, the method 300 may further comprise vibrating the platform to displace unsolidified build material from the build cake during the subsequent decaking process. In some other examples, the method 300 may further comprise vibrating the platform while emitting a gas stream towards the build cake.

According to an example, the method 300 further comprises determining the height based on data comprising at least one of the content of the build cake, a type of build material of the build cake, and a build cake state.

The content of the build cake refers to the geometry of three-dimensional printed objects within the build cake and its distribution within the build cake. For instance, when the build cake comprises geometries that include thin or fragile surfaces that may break in case of a collision, a lower drop height may be determined for the build cake. In the same way, when having an object distribution that allows for larger drop heights, for instance when having a series of rows of three-dimensional printed objects that may not be negatively affected by the drop, larger drop heights may be determined.

The types of build material of the build cake refer to the kind of build material has been used to obtain the build cake. As previously described in the description, build materials comprise powder-like granular materials such as plastics, ceramics, or metals. Depending on the type of build material, different drop heights may be determined for the build cake.

The build cake state refers to a condition of the build cake. As previously described, the build cake is generated by a combination of forming layers of build material and selectively solidifying these layers, and hence, depending on the three-dimensional printing system, different conditions for the build cake may exist. Depending on the type of build material used, mechanical properties, such as the flowability, may be temperature dependent. Thus, the drop height may be determined based on a temperature of the build cake.

According to some examples, the data associated with the build cake may be read from a tag of the container. The container may comprise a tag attached to one of its surfaces, such that when a tag reader reads the tag, the data is transmitted to a controller for determining the height from which the build cake is to be released. In other examples, the data may be stored in a data storage that is accessible by the controller.

Figure 4:
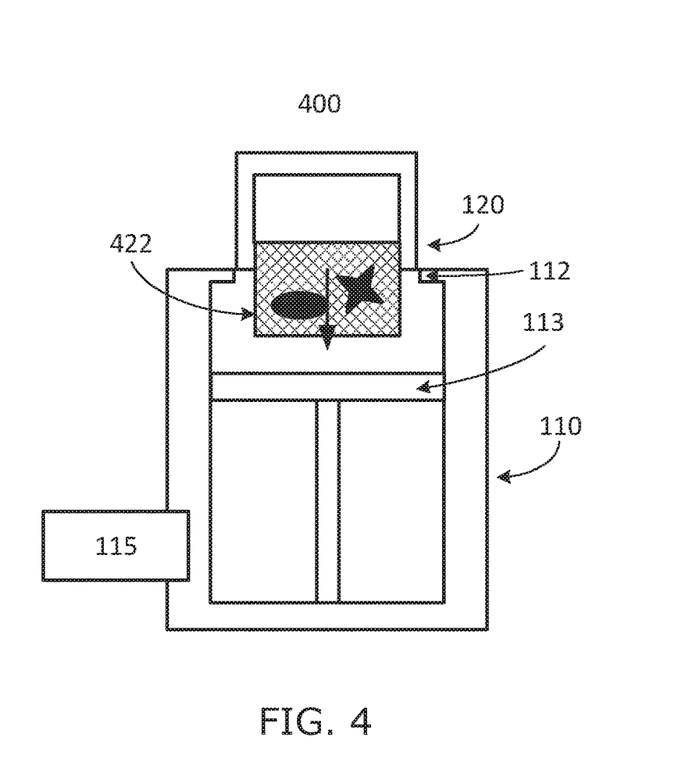
FIG. 4 shows a schematic cross-section of a three-dimensional printing system in which a base of a container is opened, according to an example of the present disclosure.

Referring now to FIG. 4, a schematic cross-section of a three-dimensional printing system 400 is shown. The three-dimensional printing system 400 comprises the cleaning station 110 and the transfer container 120, as previously explained with reference to FIGS. 1 and 2. However, in the example of FIG. 4, the openable base 121 of the container 120 has been removed once the platform 113 has been positioned by the actuator at the determined build cake receiving position, as previously explained with reference to the method 300 of FIG. 3. In some examples, the controller 115 controls the openable base 121 of the container 120 to be removed (or opened). When the base of the container 120 is opened, the build cake 422 falls under gravity through the opening 112 and collides with the platform 113 of the cleaning station 110. In some examples, the chamber has a greater cross-section than the opening. In some other examples, the opening of the base of the container may be performed electro-mechanically and may be triggered by the controller 115. In another example, the base may be opened manually by a user.

Since the cross-section of the chamber, and hence the cross-section of the platform, is greater than the cross-section of the opening, and hence the cross-section of the interface, of the chamber, a cuboid build cake having dimensions length L, width W, and height H (therefore a volume L×W×H) will, upon being transferred to the chamber, will have its height H reduced as non-solidified powder flows, moves, or otherwise spreads into the available space within the chamber. Having the height of the build cake reduced from H to $H_2$ may assist in the subsequent decaking operation.

Figure 5:
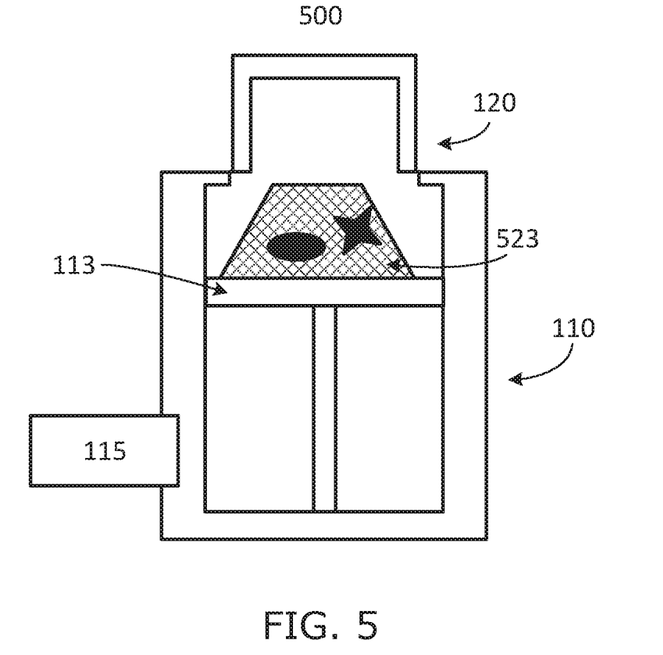
FIG. 5 shows a schematic cross-section of a three-dimensional printing system having a support platform upon which the build cake has been dropped, according to an example of the present disclosure.

Referring now to FIG. 5, a schematic cross-section of a three-dimensional printing system 500 is shown once the build cake 422 has been transferred onto the platform 113. As previously explained with reference to FIG. 2 and the method of FIG. 3, the controller 115 controls (block 320 in FIG. 3) the platform to be positioned at the build cake receiving position 117 such that when the container base is opened, the build cake drops (block 330 in FIG. 3) onto the platform from height 116. The contact between the build cake and the platform generates a shock wave that is transmitted into the build cake. As a result, a volume of unsolidified build material 523 is displaced relative to the three-dimensional objects contained within the build cake. By displacing the unsolidified build material 523 relative to the three-dimensional objects, the flowability of the agglomerated build material of build cake 422 is increased, thereby assisting in a subsequent decaking process. In some examples, the cross-section of the chamber is at least 1.3 times the cross-section of the sealable interface. The sealable interface may have the same cross-section as the opening of the chamber. In other examples, the cross-section of the chamber may be at least 1.5 times the cross-section of the sealable interface. Having a cross-section of the chamber that is greater than the cross-section of the interface, the volume of unsolidified build material released from the container, can be spread over a greater surface of the platform compared to the cross-section of the interface. As a result, a height that the build cake had within the container 120 may be reduced upon being transferred to the cleaning station 110.

Figure 6:
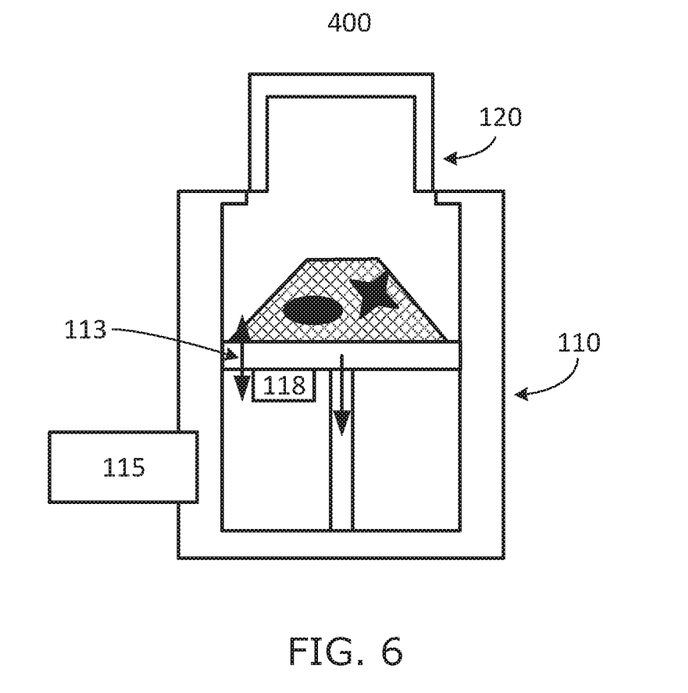
FIG. 6 shows a schematic cross-section of a three-dimensional printing system in which the support platform comprises a vibrator, according to an example of the present disclosure.

Referring now to FIG. 6, a schematic cross-section of a three-dimensional printing system 600 is shown. The three-dimensional printing system 600 comprises a cleaning station 110 engaged with a transfer container 120. The platform 113 of the cleaning station 110 further comprises a vibrator 118 to vibrate once the build cake is transferred to the platform 113. In an example, the controller 115 triggers an action from a vibrator 118 once the build cake is transferred to the platform 113. In some examples, the action comprises vibrating the platform 113 such that the unfused build material of the build cake is displaced. In other examples, the action may comprise vibrating the platform 113 while vertically moving the platform 113 to a different position within the chamber. The controller 115 may control the vibrator 118 to provide an oscillated movement to the platform 113, thereby transmitting kinetic energy to both the three-dimensional objects and the unfused build material. However, since the build material of the three-dimensional objects has been selectively solidified, a cohesion of the three-dimensional objects is greater than a cohesion of the unfused build material, and then, the vibration generated by the vibrator 118 and transmitted to the build cake, causes the unsolidified build material to further spread over the platform 113. In some examples, the vibrator 118 may provide vibration patterns to the build cake based on at least one of a type of build material used for the build cake, a state of the build cake, and contents of the build cake.

Figure 7:
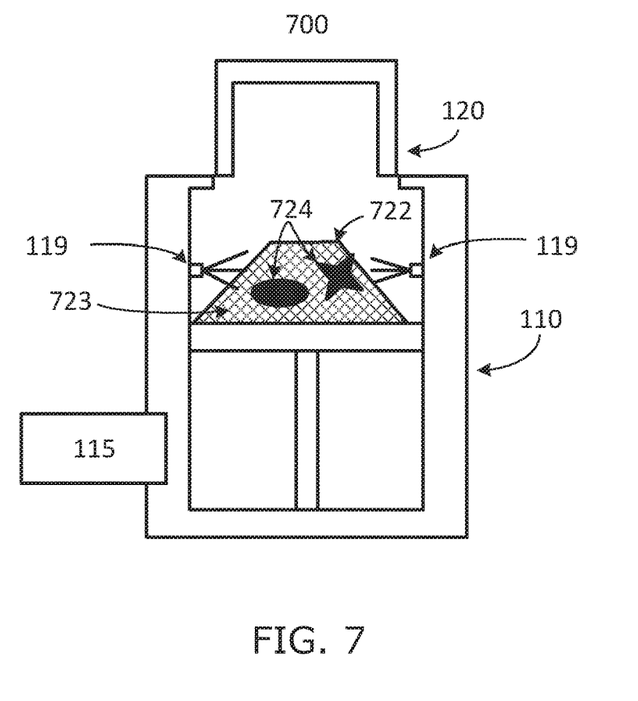
FIG. 7 shows a schematic cross-section of a three-dimensional printing system comprising a set of cleaning elements, according to an example of the present disclosure.

Referring now to FIG. 7, a three-dimensional printing system 700 having a set of cleaning elements 119 is shown. The cleaning station 110 and the transfer container 120 may correspond to one of the cleaning stations and the containers described in FIGS. 5 and 6. Once the controller 115 has controlled an opening of the base of the container to cause a build cake 722 to drop onto the platform (330 in FIG. 3), the decaking process comprises controlling with the controller 115 the platform 113 to move at a position, and then, controlling with the controller 115 the emission, with the set of cleaning elements 119 distributed along the chamber of the cleaning station 110, of a gas stream towards the build cake 722 to displace unsolidified build material 723 from three-dimensional objects 724. In an example, the set of cleaning elements 119 is a set of blowing devices or air-knives distributed along at least one internal wall of the chamber. In some other examples, as previously explained with reference to FIG. 6, the controller 115 may control a vibrator to vibrate the platform so as to transmit a shock wave to the build cake 722 at the same time that the set of cleaning elements 119 eject a gas stream towards the build cake 722 to disturb the unsolidified build material 723. In further examples, the set of cleaning elements devices may be replaced by another type of cleaning elements, such as brushers to physically displace the unsolidified build material 723.

According to some examples, the controller 115 may determine a series of actions to be executed over the build cake in order to displace the unsolidified build material from the three-dimensional printed objects. The actions may comprise dropping the build cake from a height onto a platform (as described in reference with FIGS. 4 and 5), vibrating the platform (as described in reference with FIG. 6), ejecting a gas stream towards the build cake (as explained in reference with FIG. 7), or a combination thereof.

In an example, the cross-section of the opening is 350× 450 mm and the cross-section of the chamber (and the platform) is 550×550 mm, and hence, the cross-section of the chamber is 1.92 times the cross-section of the interface. Having a greater cross-section may enable a build cake having a height of 100 mm to be reduced up to approximately a 50%. In case of having a build cake of unsolidified build material, a height of the unsolidified build material may be potentially reduced around 2 times upon a decaking process has taken place. On the other hand, the impact of emitting a gas stream with cleaning elements towards the build cake may be reduced. In other examples, the cross-section of the interface is 350×450 mm and the cross-section of the chamber is 465×465 mm (the cross-section of the chamber is around 1.4 times the cross-section of the interface). Having a smaller chamber cross-section enables the set of cleaning elements to reach further unsolidified build material compared to when the chamber has a greater cross-section. Hence, the selection of a relationship between cross-sections may be subjected to a balance between the height reduction and other decaking features such as the gas stream application. In other examples in which the cross-section of the base of the container and the cross-section of the opening are different, the relationship may be calculated between the cross-section of the base and the cross-section of the chamber (and the platform).

Figure 8:
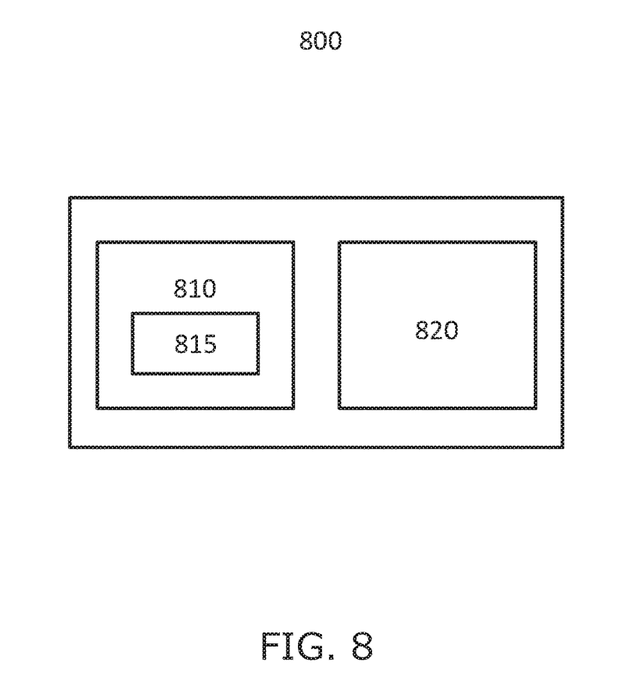
FIG. 8 shows a system comprising a processor-readable medium and a processor, according to an example of the present disclosure.

Referring now to FIG. 8, a system 800 comprising a processor-readable medium 810 and a processor 820 is shown. The processor-readable medium 810 comprises instructions 815, that when executed by the processor 820, cause the system 800 to perform a method. Examples of methods comprise method 300 previously described with reference to FIG. 3.

In some examples, the processor-readable medium 810 may be a computer-readable storage medium. However, in other examples, processor-readable medium 810 may be any non-transitory tangible medium that can embody, contain, store, or maintain instructions for use by a processor 830. Processor readable media include, for example, electronic, magnetic, optical, electromagnetic, or semiconductor media. More specific examples of suitable processor-readable media include a hard drive, a random access memory (RAM), a read-only memory (ROM), memory cards and sticks, and other portable storage devices.

In an example, the instructions 815 cause the system 800 to determine a distance from which a build cake is to be releasably dropped in order to disturb a volume of unsolidified build material. In other examples, the instructions 815 cause the system 800 to: determine a distance from which a build cake is to be dropped onto a platform of a cleaning system such as the cleaning stations of FIGS. 1 to 2 and 4 to 7, move the platform to a position that is the determined distance below a base of the container, and release the build cake from the container so that the build cake drops onto the platform to disturb a volume of unsolidified build material of the build cake. The distance may be the height below the container that has been explained previously with reference to FIGS. 1 to 2 and 4 to 7 and the related examples.

According to an example, the instructions 815 may be read, for instance, by the controller 115 of the three-dimensional printing systems 100, 200, 400, 500, 600, and 700 of FIGS. 1, 2, 4, 5, 6 and 7.

In some examples, the instructions 815 may further cause the system 800 to obtain data associated with the build cake from an external memory, wherein the data comprises at least one of the geometries of the set of three-dimensional objects within the build cake, type of build material used for the build cake, and a build cake state. In some other examples, the external memory is a readable tag attached on a surface of the container, wherein the data is to be read by a sensor of the cleaning system. In further examples, the external memory may be the data storage 130 previously described with reference with FIGS. 1 and 2.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims (and their equivalents) in which all terms are meant in their broadest reasonable sense unless otherwise indicated.

The invention claimed is:

1. An apparatus for a three-dimensional printing system, the apparatus comprising:
    a chamber comprising an opening towards a top of the chamber configured to receive a container having an openable base, the container configured to contain a build cake, the chamber further comprising a vertically movable platform below the opening, the vertically movable platform configured to receive the build cake when the openable base of the container is opened;
    an actuator configured to move the vertically movable platform within the chamber; and
    a controller configured to position the vertically movable platform at a build cake receiving position that is a height below the openable base of the container such that when the openable base of the container is opened, the build cake drops onto the vertically movable platform generating a shock wave that is transmitted into the build cake.

2. The apparatus of claim 1, wherein the vertically movable platform further comprises a vibrator to vibrate upon the build cake when the build cake is dropped onto the vertically movable platform.

3. The apparatus of claim 1, wherein the controller is configured to determine the height below the openable base of the container that the build cake is to drop based on at least one of a content of the build cake, a type of material used to form the build cake, and a build cake state.

4. The apparatus of claim 3, wherein the controller is further configured to determine the height based on at least one of:
    a geometry of a three-dimensional object contained within the build cake; and
    a distribution of the three-dimensional object within the build cake.

5. The apparatus of claim 3 further comprising a set of blowing devices distributed along at least one internal wall of the chamber, wherein the set of blowing devices are configured to eject a gas stream towards the build cake.

6. The apparatus of claim 1, wherein the opening comprises an interface configured to sealably receive the openable base of the container, where a first cross-section of the interface is smaller than a second cross-section of the chamber.

7. The apparatus of claim 6, wherein the second cross-section of the chamber is at least 1.3 times the first cross-section of the interface configured to sealably receive the openable base of the container.

8. A method comprising:
    determining a height below an openable base of a container that a build cake is to be dropped from the container onto a vertically movable platform of a chamber of an apparatus for a three-dimensional printing system, the chamber comprising an opening towards a top of the chamber configured to receive the container;
    positioning the vertically movable platform at the determined height below the openable base of the container; and
    opening the openable base of the container to cause the build cake to drop under gravity onto the vertically movable platform to cause a shock wave to be transmitted into the build cake to assist in a subsequent decaking process.

9. The method of claim 8 further comprising emitting, with a set of cleaning elements distributed along the chamber, a gas stream towards the build cake to displace unsolidified build material from the build cake during the subsequent decaking process.

10. The method of claim 8, further comprising determining the height based on a print job data comprising at least one of:
    content of the build cake;
    a type of build material of the build cake; and
    a build cake state.

11. The method of claim 10, wherein determining the height further comprises determining the height based on a temperature of the build cake.

12. The method of claim 10 further comprising reading the print job data from a tag of the container, wherein the tag is read by a tag reader that transmits the print job data to a controller for determining the height.

13. A processor readable medium comprising instructions, that when executed by a processor, cause a system to:
    determine a distance from which a build cake in a container having an openable base is to be releasably dropped onto a vertically movable platform of a chamber of a cleaning system, wherein the build cake comprises a set of three-dimensional objects surrounded by a volume of unsolidified build material;
    move the vertically movable platform vertically to a position that is the determined distance below the openable base of the container, wherein chamber comprises an opening towards a top of the chamber configured to receive the container having the openable base; and
    release the build cake from the container so that the build cake drops onto the vertically movable platform to disturb the volume of unsolidified build material of the build cake by generating a shock wave that is transmitted into the build cake.

14. The processor readable medium of claim 13 further comprising instructions to cause the system to obtain data associated with the build cake from an external memory, wherein the data comprises at least one of:
    geometries of the set of three-dimensional objects within the build cake;
    type of build material used for the build cake; and
    a build cake state.

15. The processor readable medium of claim 14, wherein the external memory is a readable tag attached on a surface of the container, wherein the data is to be read by a sensor of the cleaning system.

* * * * *